United States Patent
Venkateswaran

(10) Patent No.: US 8,274,781 B2
(45) Date of Patent: Sep. 25, 2012

(54) FORM FACTORED AND FLEXIBLE ULTRACAPACITORS

(75) Inventor: Sagar N. Venkateswaran, Glen Mills, PA (US)

(73) Assignee: Optixtal, Inc., Philadelphia, PA (US)

( * ) Notice: Subject to any disclaimer, the term of this patent is extended or adjusted under 35 U.S.C. 154(b) by 206 days.

(21) Appl. No.: 12/925,977

(22) Filed: Nov. 3, 2010

(65) Prior Publication Data

US 2012/0106028 A1    May 3, 2012

(51) Int. Cl.
*H01G 9/00* (2006.01)
(52) U.S. Cl. ........ 361/502; 361/503; 361/504; 361/509; 361/512; 361/516
(58) Field of Classification Search ........... 361/502, 361/503–504, 509–512, 303–305, 516–519, 361/523–525, 528–529
See application file for complete search history.

(56) References Cited

U.S. PATENT DOCUMENTS

| | | | | |
|---|---|---|---|---|
| 5,150,283 | A * | 9/1992 | Yoshida et al. | 361/502 |
| 6,212,061 | B1 * | 4/2001 | Irwin et al. | 361/502 |
| 6,914,768 | B2 * | 7/2005 | Matsumoto et al. | 361/502 |
| 7,236,348 | B2 * | 6/2007 | Asano et al. | 361/502 |
| 7,407,520 | B2 * | 8/2008 | Farahmandi et al. | 29/25.03 |
| 7,443,651 | B2 * | 10/2008 | Ando et al. | 361/503 |
| 7,871,739 | B2 * | 1/2011 | Tomita et al. | 429/531 |
| 8,164,881 | B2 * | 4/2012 | Hu et al. | 361/502 |

* cited by examiner

*Primary Examiner* — Nguyen T Ha

(57) ABSTRACT

Advanced ultracapacitor construction of irregular shape is provided, having higher utilization of the available energy storage shape in various electronic and electromechanical products over the prior art ultracapacitors. Said irregular shape of ultracapacitor is achieved by using flexible and pliable cell materials in layers, blanked into any desired shape, and stacked. The layers may be also bent to follow any contour. More capacity in given irregular volume is thus accomplished.

12 Claims, 3 Drawing Sheets

FORM FACTORED AND FLEXIBLE ULTRACAPACITORS

BACKGROUND OF THE INVENTION

1. Field of the Invention

This invention pertains mostly to flexible irregular shape ultracapacitors having various footprint shapes, to conform into non-linear space of various electronic and electromechanical products. Ultracapacitor cell of this invention comprises at least two thin flexible and porous electrodes with a porous separator there between, all sealed in a flexible, thin, moisture proof pouch and soaked with a liquid electrolyte. The electrodes have current collectors with sealed tabs exiting from said pouch, to be connected to a circuitry of any desirable product.

2. Description of Prior Art

Prior art ultracapacitors also referred to as supercapacitors or electrochemical capacitors, have cylindrical or prismatic shape with rolled or flat cells in a hard metal container, which is non-conformal and difficult to fit into an irregular energy storage space of various devices. Examples are; cylindrical ultracapacitors of Maxwell Corporation and rectangular ultracapacitors of Nippon-Chemicon Company. Another known prismatic ultracapacitor packaging is having the cells sealed in a soft rectangular or square aluminum foil, coated by a heat sealable plastic layer. However, these ultracapacitors still have a linear prismatic shape, similar to the hard metal prismatic casings, and therefore have similar problems with fitting into an irregular space. To address this problem, others have proposed to connect many small ultracapacitors to fill the desired shape of space, but this is very expensive and time consuming construction with high percentage of the active space wasted by connectors. The instant invention provides solution of these problems by having flexible, thin flat cells cut into any desirable shape or outline of the footprint, to fill the space efficiently. Several of these shaped and conformed ultracapacitor cells can be also stacked, and also bended to follow a radius of a cylindrical container or similar structure. Ultracapacitors are currently used as boosters and protectors of batteries from overloads, or as sole electrochemical energy storage units, when short, high rate electric currents are absorbed or needed to be delivered.

SUMMARY OF THE INVENTION

Now it has been found, that irregular space shape for energy storage of various electrical devices can be more efficiently utilized by having flexible ultracapacitor cells constructed as thin layers, cut into any desired irregular footprint shape of the space provided, and then may be stacked to fill the cubic dimensions if desired. These thin flexible ultracapacitor cells above can be also bent to follow any contour, such as cylindrical structure or corrugated structure. The flexibility is accomplished by having flexible thin electrodes welded to soft flexible and thin separator there between, and all is packaged in a thin and flexible pouch. The electrodes are easy to bend and stretch, due to having porous micro-grid metal current collectors, which can linearly compress or expand during bending. Normally, a three layer solid structure would be stiff and be resisting bending. The micro-grids and flexible binder of the electrodes makes the cell structure pliable and bendable, without loosing integrity for electrochemical functions. These irregular shaped ultracapacitors may be also referred to as form factored ultracapacitors.

The principal object of this invention is to provide ultracapacitor, which can fill any irregular space shape more efficiently then prior art ultracapacitors, and thus to provide more capacity per available volume. Another object of this invention is to provide ultracapacitor which is flexible bendable and pliable without loosing its integrity and its functionality. Another object of this invention is to provide ultracapacitor, which is durable and easy to manufacture at low cost. Other objects and advantages of the invention will be apparent from the description and appended claims.

BRIEF DESCRIPTION OF THE DRAWINGS

The nature and characteristics features of the invention will readily understood from the following description taken in connection with accompany drawing, in which.

It should, of course, be understood that the description and the drawings herein are merely illustrative, and it will be apparent that various modifications, combinations and changes can be made of the structures and the systems disclosed without departing from the spirit of the invention and from the scope of the appended claims.

DETAILED DESCRIPTION OF THE PREFERRED EMBODIMENTS

When referring to the preferred embodiments, certain terminology will be utilized for the sake of clarity. Use of such terminology is intended to encompass not only the described embodiment, but also all technical equivalents which operate and function in substantially the same way to bring about the same results.

Ultracapacitor usually comprises two high surface carbon electrodes coated on metal current collectors and a porous, electrically insulating separator between the electrodes. This assembly is soaked with a liquid electrolyte and sealed in a moisture proof container with insulated and sealed one positive and one negative terminals, electrically connected to the current collectors and exiting from said container. Form factor becomes critical when integrating the ultracapacitor into irregular space. How this can be accomplished is explained below.

Figure 1:
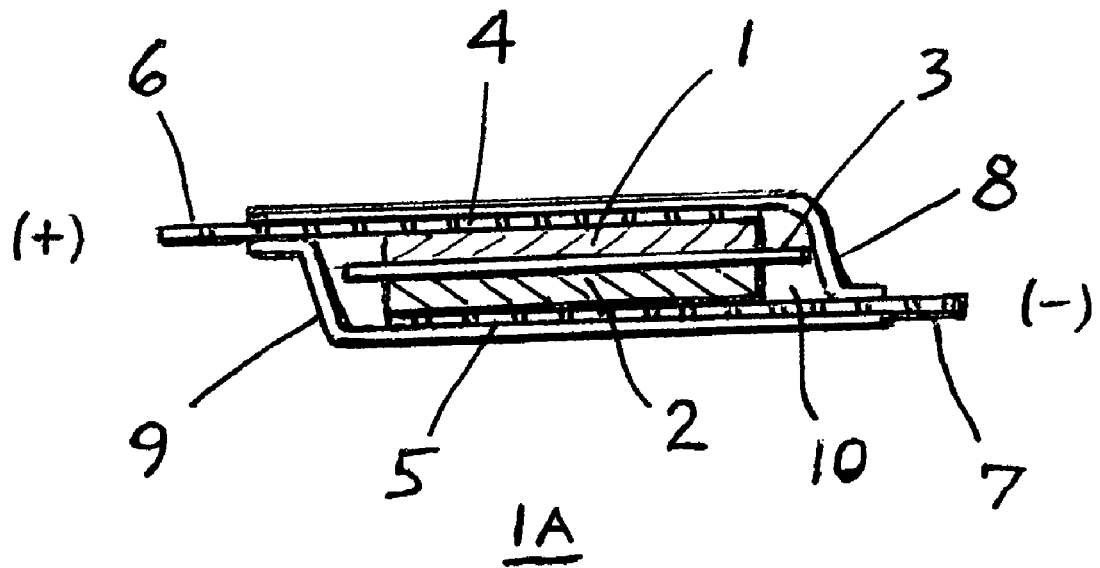
FIG. 1 illustrates schematic sectional side view of thin ultracapacitors cell of the invention, showing two thin electrodes with current collectors and flat terminal tabs exiting forms sealed elastic pouch layers.
Figure 2:
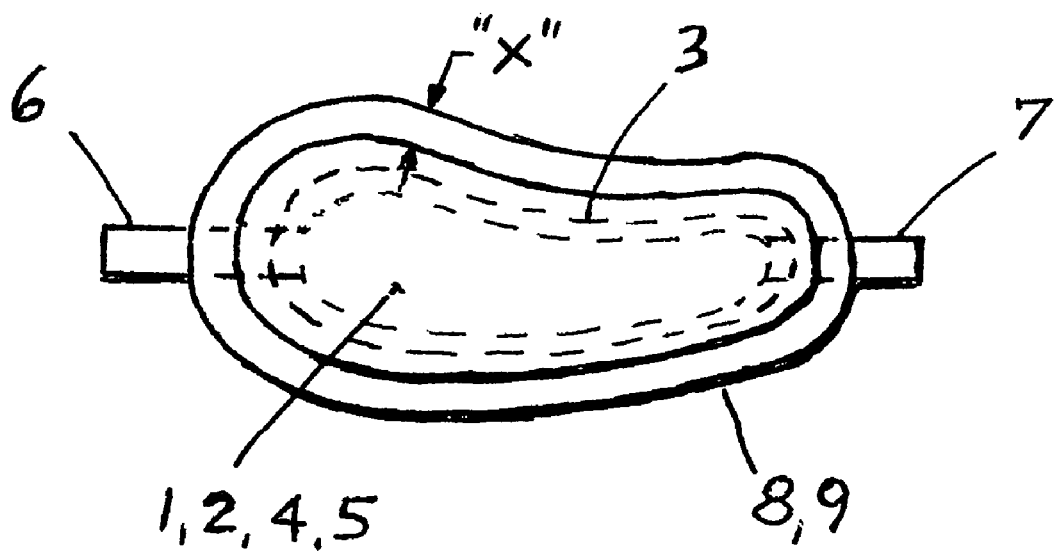
FIG. 2 illustrates schematic top view of the irregular shape ultracapacitor cell shown in FIG. 1.

Referring now in more detail and particularly to FIGS. 1 and 2, which is one embodiment of the invention, showing ultra-thin and flexible ultracapacitor cell 1A having irregular shape footprint, and which cell comprises:

Irregularly shaped flexible carbon or a metal oxide electrodes 1 and 2, coated on the same shape flexible current collectors 4 and 5 with terminals 6 and 7; porous electrically insulating irregular shape flexible separator 3 between the electrodes; and electrolyte 10 soaked into the electrodes and into the separator; and irregular shaped, flexible, moisture-proof pouch sheets 8 and 9, heat sealed together all around the contour of the cell 1A by the seal width "x".

Figure 3:
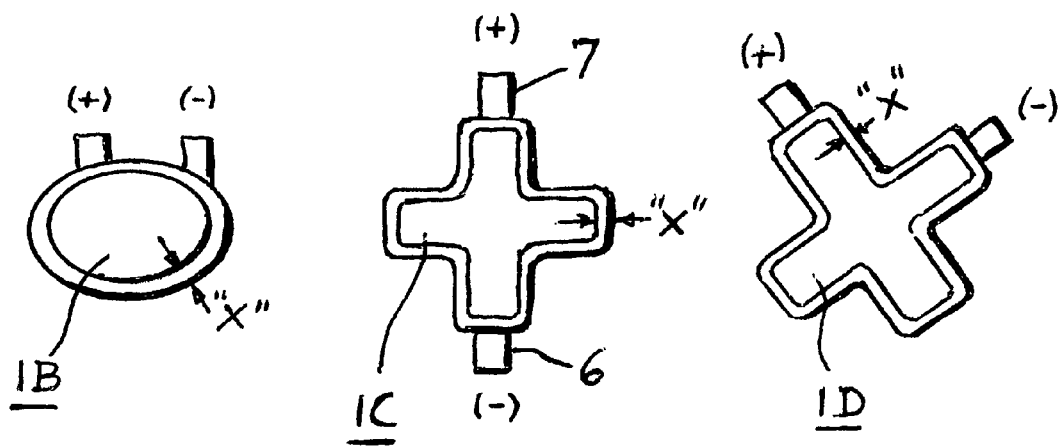
FIG. 3 illustrates schematic top views of various shapes of ultracapacitors of the invention.

Another embodiment of the invention is shown in FIG. 3, illustrating various flat ultracapacitor cells having oval shape footprint as the cell 1B; "cross" shape footprint as the cell 1C; and "X" shape footprint as the cell 1D. All the cells are heat sealed all around their contour by heat seal width "x". It is apparent, that any desirable shape is thus possible, including disc, "donut", triangle, etc. Several cells preferably having the same shape can be stacked and connected electrically by the tabs 6 and 7 in series to create higher voltage, or in parallel to increase capacity.

Figure 4:
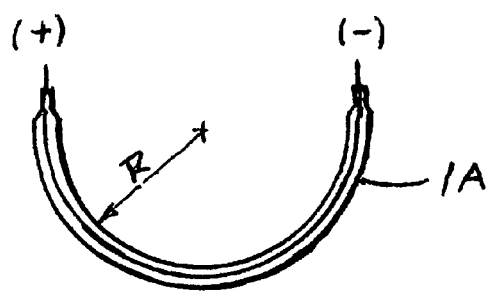
FIG. 4 illustrates side elevational view of thin flexible and pliable ultracapacitor cell of the invention, which is bent into a radius.

Another embodiment of the invention is shown in FIGS. 4 and 1, illustrating ultracapacitor cell 1A bent around a radius, which is possible due to flexible and pliable structure of the cell of the instant invention. The flexibility and pliability is achieved by utilizing micro-porous grid metal current collector 4 and 5 of the electrodes 1 and 2, flexible polymeric binder of the electrodes, such as PVDF copolymer, and having the electrodes welded to soft and flexible separator 3 in the middle. Outer pouch layers 8 and 9 are also flexible and stretchable, made of metalized moisture-proof polymer film coated or cladded with polyethylene or surlyn layer (available from Dupont Corporation, DE). The cells with the metal grids expand and contract during bending easily, (unlike solid metal foils) without loosing electrochemical functions. Metal foils of the prior art would delaminate.

Figure 5:
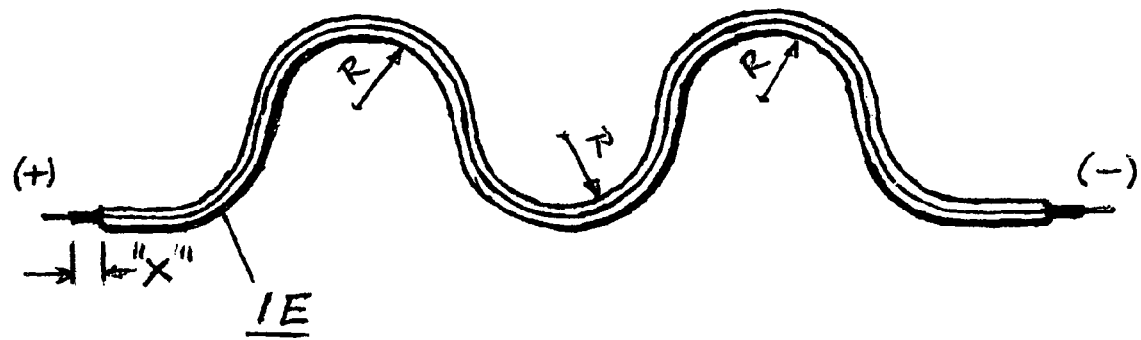
FIG. 5 illustrates side elevational view of thin flexible and pliable ultracapacitor cell having multiple bends of corrugation.

Another embodiment of the invention is shown in FIG. 5, illustrating ultracapacitor cell 1E bent into a corrugated shape, which is also possible due to the same construction features as described for the cell 1A.

Figure 6:
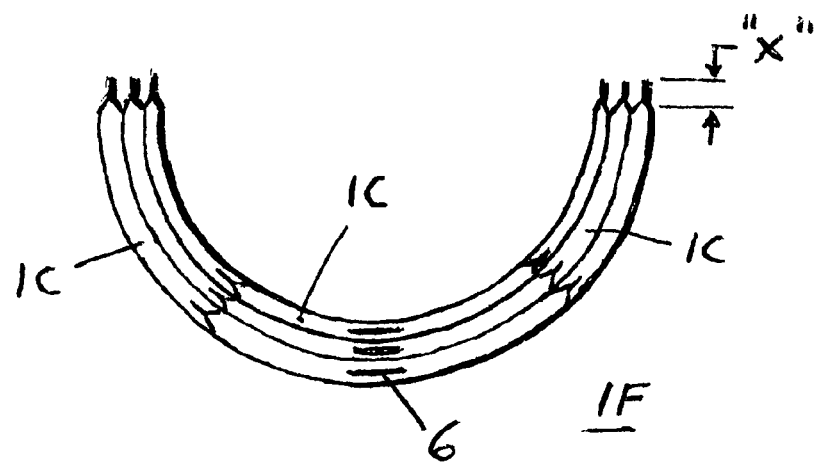
FIG. 6 illustrates side elevational view of several flexible ultracapacitor cells of FIG. 3 stacked and bended to confirm to a radius.

In FIG. 6, which is another embodiment of the invention, is shown a plurality of irregular shaped ultracapacitor cells 1C stacked and bended around a radius, to fit into a cylindrical structure, such as a missile. Again, these cells can be variously connected to obtain high voltage and/or high capacity pack with maximum utilization of the available space, due to the same cell construction features as described for cell 1A.

All references cited herein are incorporated by reference for all purposes. It should of course be understood, that the description and the drawings herein are merely illustrative and it will be apparent, that various modifications and combinations can be made of the structures and the systems disclosed without departing from the spirit of the invention.

I claim:

1. An ultracapacitor having a contour which conforms to fit any irregular shaped space and which comprises:
   at least one thin and flexible ultracapacitor cell having irregularly shaped footprint, sealed in a flat and flexible, moisture-proof pouch, which pouch follows said ultracapacitor cell contour shape, and which pouch contains at least two flexible and porous electrodes, coated on flexible and porous metal current collectors;
   at least two terminal tabs electrically connected to said current collectors and exiting from said pouch in sealed manner;
   at least one flexible and porous, electrically insulating separator, between said electrodes in overlaying relation;
   and a liquid electrolyte in contact with said electrodes and said separator.

2. An ultracapacitor as described in claim 1, which is bendable to follow a radius.

3. An ultracapacitor as described in claim 1, in which said cell footprint is shaped in the form of an oval.

4. An ultracapacitor as described in claim 1, in which said cell footprint is shaped in the form of a cross.

5. An ultracapacitor as described in claim 1, in which said cell footprint is shaped in the form of the letter "X".

6. An ultracapacitor as described in claim 1, in which said cell footprint is shaped in the form of a "donut".

7. An ultracapacitor as described in claim 1, in which said cell footprint is shaped in the form of a "disc".

8. An ultracapacitor as described in claim 1, in which said cell footprint is shaped in the form of a "triangle".

9. An ultracapacitor as described in claim 1, in which said current collectors are made of metal micro-grids.

10. An ultracapacitor as described in claim 1, in which said electrodes are welded to said separator.

11. An ultracapacitor as described in claim 1, in which said pouch is made of flexible metalized polymer coated with polyethylene.

12. An ultracapacitor as described in claim 1, in which said pouch is coated with surlyn polymer.

\* \* \* \* \*